United States Patent [19]

Okajima et al.

[11] Patent Number: 5,393,724
[45] Date of Patent: Feb. 28, 1995

[54] PROCESS FOR REMOVING OXIDIZABLE SUBSTANCE OR REDUCIBLE SUBSTANCE, COMPOSITE CONTAINING METAL OXIDE OR HYDROXIDE, AND PROCESS FOR PRODUCTION THEREOF

[75] Inventors: Kengo Okajima; Hiroyuki Wakamatsu; Tsugio Murakami; Hiroyuki Saitoh, all of Yamaguchi, Japan

[73] Assignee: Tosoh Corporation, Yamaguchi, Japan

[21] Appl. No.: 53,767

[22] Filed: Apr. 28, 1993

[30] Foreign Application Priority Data

Apr. 30, 1992 [JP] Japan ................... 4-135648

[51] Int. Cl.⁶ ............... B01J 20/26; B01J 20/02; B01J 21/04
[52] U.S. Cl. ................... 502/402; 502/406; 502/439; 502/514
[58] Field of Search ............... 502/402, 406, 439, 514

[56] References Cited

U.S. PATENT DOCUMENTS 4,162,187  7/1979  Smith et al. .
4,231,869 11/1980  Carlberg et al. .

FOREIGN PATENT DOCUMENTS 0211530  2/1987  European Pat. Off. .
0393403 10/1990  European Pat. Off. .
1582308  9/1969  France .
2059793  4/1981  United Kingdom .

*Primary Examiner*—Helen M. S. Sneed
*Assistant Examiner*—Nhat D. Phan
*Attorney, Agent, or Firm*—Nixon & Vanderhye

[57] ABSTRACT

An oxidizable substance and/or a reducible substance is removed from a liquid, such as a liquid industrial waste, by treating the liquid with a composite comprising a fluorine-containing organic cation exchanger and a metal oxide or hydroxide, supported on the cation exchanger. The metal of the metal oxide or hydroxide is selected from manganese and elements of group 1B and group 8 of the periodic table. This treatment is carried out, if required, in the presence of an oxidizing agent, or by using the composite which has previously been treated with an oxidizing agent.

6 Claims, No Drawings

PROCESS FOR REMOVING OXIDIZABLE SUBSTANCE OR REDUCIBLE SUBSTANCE, COMPOSITE CONTAINING METAL OXIDE OR HYDROXIDE, AND PROCESS FOR PRODUCTION THEREOF

BACKGROUND OF THE INVENTION

1. Field of the Invention

This invention relates to a process for removing an oxidizable substance or a reducible substance, which are present, for example, in a liquid industrial waste, by decomposing the oxidizable substance or reducible substance in the presence of a metal oxide or hydroxide. The invention further relates to a composite comprising an organic cation exchanger and a metal oxide or hydroxide supported on the cation exchanger, which is suitable for the process for removal of the oxidizable substance or reducible substance, and to a process for producing the composite.

2. Description of the Related Art

Metal oxides and hydroxides as catalysts are used in a finely divided particulate form. The finely divided particulates have poor working and handling characteristics, and therefore, are usually used as shaped articles or in a form supported on a carrier.

For example, a cation exchange membrane made of a fluorinated polymer for electrolysis of an aqueous solution of an electrolyte such as an alkali metal chloride is described in Japanese Unexamined Patent Publication No. 5739185, U.S. Pat. No. 4,661,218 and European Patent Application No. 66,102. The cation exchange membrane has a gas and liquid permeable porous layer formed thereon to reduce the cell voltage, which layer is made from a powder of, for example, a metal oxide by a process wherein the metal oxide powder is mixed with a binder in a liquid medium, and the mixture is applied onto the membrane and heat-pressed on the membrane. The resulting cation exchange membrane is a composite composed of a cation exchange membrane of a fluorinated polymer and a porous layer which is made from a metal oxide powder and physically bonded to the membrane.

Processes for decomposing reducible substances (COD ingredients) wherein a liquid containing reducible substances is placed in contact with a metal oxide catalyst in the presence of an oxidizing agent such as a hypochlorite in a fluidized form have been proposed in Japanese Unexamined Patent Publication No. 52-41453, 52-105651 and 52-23860. In these proposed processes, the catalyst is removed and recovered after they are used for the decomposition, to avoid a pollution nuisance and reduce the treating cost. However, since the catalyst is finely divided, it is difficult to filter and a filtering apparatus of a large capacity is required.

To solve the above-mentioned problems of the metal oxide catalyst in a finely divided form, it has been proposed to use a metal oxide catalyst in a form supported on a carrier or in a shaped article form made by using a binder, for example, in Japanese Unexamined Patent Publication No. 52-128648, 49-37465 and 55-27075. More specifically, a catalyst composed of a nickel oxide, manganese oxide or cobalt oxide, which is supported on a carrier by using a chlorine- and/or fluorine-containing resin binder, is described in Japanese Unexamined Patent Publication No. 55-27075. This catalyst is made by supporting a salt of nickel, manganese or cobalt on a carrier by using the resin binder; curing the resin binder; and then the supported metal salt is treated with an oxidizing agent. The catalyst supported on a carrier has good and handling characteristics, but has problems such that the catalyst and the resin binder are liable to be separated during the use of the catalyst with the result of a pollution nuisance due to suspended substances and the metal catalyst ingredient. Further, where the solution to be treated contains suspended substances or ions capable of readily forming insoluble or slightly soluble substances, such as a calcium ion and a magnesium ion, problems arise such that the suspended substances or a precipitate formed from the ion are deposited on the surface of the catalyst with the result of a drastic reduction of the catalytic activity.

As an example of the process for decomposing reducible substances in a solution by treating the solution with a metal oxide, a process has been proposed in Japanese Unexamined Patent Publication No. 63-130141 wherein a hypochlorite is decomposed by treating the hypochlorite-containing solution with a catalyst composed of a platinum-group metal oxide alone or of a platinum-group metal oxide supported on an inorganic carrier such as titanium or ceramics. Where this catalyst in a powder form is used in a suspended bed or fluidized bed, it is difficult to prevent the catalyst from flowing out from the suspended bed or fluidized bed. If the catalyst is in the form of a shaped article, the catalyst cannot be used in a suspended bed or fluidized bed. Further, a baking treatment must be carried out at a temperature exceeding 300° C. for supporting the platinum-group metal catalyst on the inorganic carrier.

It has been proposed to use a catalyst in the form of a solution or suspension of a salt or oxide of nickel or copper in Japanese Unexamined Patent Publication No. 56-65633 and 60-71086. To avoid a pollution nuisance and reducing the catalyst cost, the catalyst must be separated and recovered from a liquid which has been treated with the catalyst, and occasionally the recovered catalyst must be subjected to a regeneration treatment. However, the catalyst is in a finely divided form and is difficult to recover in an industrial scale without the use of an apparatus having a large capacity.

Various catalysts have been proposed which are in the form of a shaped article or supported on a carrier, for example, in Japanese Unexamined Patent Publication No. 61-149240 and 56-108587, UK Patent Application No. 2,059,793, and U.S. Pat. Nos. 4,430,315 and 4,442,227. More specifically, a pelleted catalyst composition comprising a catalytically active ingredient such as nickel oxide or cobalt oxide embedded in an organic resin matrix is described in UK Patent Application No. 2,059,793. This pelleted catalyst composition is made by intimately dispersed a powdery catalytically active ingredient in a powdery organic resin matrix such as a polyolefin or a halogenated polyolefin; forming the intimately mixed powdery composition into pellets by compacting them; and then sintering the pellets at or about the softening temperature of the organic resin matrix. In this pelleted catalyst composition, the catalytically active ingredient is physically compacted with the organic resin, and therefore, the bonding force is weak and the catalyst composition cannot be used in a suspended bed or a fluidized bed. Even where the catalyst composition is used in a fixed bed, the catalyst is separated from the pellets when used for a long period of time, which leads to loss of catalyst, clogging of pipe lines and a pollution nuisance due to suspended substances and the separated catalyst. If a solution to be treated with the catalyst composition contains solid ingredients, the solid ingredients must be removed prior to the treatment with the catalyst composition. Further, the process of the preparation of the catalyst composition is complicated and lengthy, and only the surface portion of the pelleted catalyst participates in the reaction.

In Japanese Unexamined Patent Publication No. 60-71085, a method of decomposing hydrogen peroxide in a liquid by using a composite comprised of a palladium catalyst supported on an anion exchange resin such as a styrene-divinylbenzene copolymer-based anion exchange resin. This composite has an enhanced effective surface area, but a poor thermal resistance and chemical resistance because of the hydrocarbon polymer. Since the composite is used in a liquid containing hydrogen peroxide, the catalyst activity is reduced at a high rate.

SUMMARY OF THE INVENTION

A primary object of the invention is to provide a process for removing an oxidizable substance or a reducible substance, which is present in a liquid by decomposing the oxidizable or reducible substance by a metal oxide or hydroxide catalyst, wherein the above-mentioned problems have been solved and which has the following advantages:

(1) the metal oxide or hydroxide exhibits a high activity for the decomposition;

(2) the activity is reduced only to a minor extent with the lapse of time;

(3) the metal oxide or hydroxide does not readily flow out from a reactor;

(4) the catalytic activity is reduced only to a negligible extent even when suspended substances are present in a liquid to be treated;

(5) a precipitate is not readily produced even when an alkaline earth metal ion is present in a liquid to be treated, and, even if a precipitate is produced, the activity is reduced only to a minor extent; and (6) there is no need of using an additional agent other than the oxidizing agent, and the equipment cost is low.

Another object of the invention is to provide a composite comprising a metal oxide or hydroxide catalyst and a process for producing the composite, said composite having the following advantages:

(1) the mechanical strength is high;

(2) the chemical stability is high;

(3) the catalyst ingredient is not readily separated;

(4) the change of properties and shape occurs only to a minimum extent;

(5) the effective surface area is large; and (6) the production is easy and the production cost is low.

In one aspect of the invention, there is provided a process for removing an oxidizable substance from a liquid containing the oxidizable substance, which comprises placing the oxidizable substance-containing liquid in contact with a composite comprising a fluorine-containing organic cation exchanger and at least one metal oxide or hydroxide, in the presence of an oxidizing agent; said metal being selected from manganese and elements of groups 1B and group 8 of the periodic table, and said metal oxide or hydroxide being supported on the fluorine-containing organic cation exchanger.

In another aspect of the invention, there is provided a process for removing an oxidizable substance from a liquid containing the oxidizable substance, which comprises placing the above-mentioned composite in contact with an oxidizing agent; and then, placing the composite in contact with the oxidizable substance-containing liquid.

In still another aspect of the invention, there is provided a process for removing a reducible substance from a liquid containing the reducible substance, which comprises placing the reducible substance-containing liquid in contact with the above-mentioned composite.

In a further aspect of the invention, there is provided a composite comprising a fluorine-containing organic cation exchanger and at least one metal oxide or hydroxide, said metal being selected from manganese and elements of group 1B and group 8 of the periodic table, and at least 5% of the entire amount of the metal oxide or hydroxide being supported within the fluorine-containing organic cation exchanger.

In a further aspect of the invention, there is provided a process for producing a composite comprising a fluorine-containing organic cation exchanger and at least one metal oxide or hydroxide, said metal being selected from manganese and elements of group 1B and group 8 of the periodic table, and at least part of the metal oxide or hydroxide being supported within the fluorine-containing cation exchanger, which process comprises exchanging the counter ion of a fluorine-containing organic cation exchanger for at least one ion selected from manganese ion and ions of elements of group 1B and group 8 of the periodic table, and then placing the fluorine-containing organic cation exchanger in contact with at least one material selected from alkalis and oxidizing materials.

DESCRIPTION OF THE PREFERRED EMBODIMENTS

The invention will now be described in detail with reference to preferred embodiments thereof.

Metal Oxide or Hydroxide

The metal oxide or hydroxide used for the preparation of the composite comprising a fluorine-containing organic cation exchanger and at least one metal oxide or hydroxide, supported on the cation exchanger, is an oxide or hydroxide of a metal selected from manganese, elements of group 1B of the periodic table such as copper and silver, and elements of group 8 of the periodic table such as iron, cobalt, nickel, palladium and platinum. By the term "metal oxide or hydroxide" used herein, we mean not only oxide and hydroxide of the above-mentioned metal, but also peroxide and oxyhydroxide.

As specific examples of the metal oxide or hydroxide, there can be mentioned $Mn(OH)_2$, $MnO_2$, $Mn_2O_3$, $Mn_3O_4$, $Fe(OH)_2$, $Fe(OH)_3$, $Fe_2O_3$, $Fe_3O_4$, $FeO$, $Co(OH)_2$, $Co(OH)_3$, $Co_2O_3$, $Co_3O_4$, $CoO_2$, $Ni(OH)_2$, $NiO$, $Ni_2O_3$, $Ni_3O_4$, $NiO_2$, $NiOOH$, $Cu(OH)_2$, $CuO$, $Cu_2O$, $Pd(OH)_2$, $Pd_2O$, $Pd_2O_3$, $PdO_2$ and $PdO_3$. Of these, oxides and hydroxides of Ni, Co, Cu and Pd are preferable for consideration of cost and others, and oxides and hydroxides of Ni and Co are most preferable.

It is possible that, when a liquid containing an oxidizable substance or a reducible substance is treated with the composite, the metal oxide or hydroxide supported on the fluorine-containing organic cation exchanger chemically changes and exerts an action of decomposing the oxidizable substance or the reducible substance. More specifically, it is possible that when the oxidizable substance- or reducible substance-containing liquid is placed in contact with the metal oxide or hydroxide, for example, the valency of metal varies or a metal oxide or hydroxide varies to another metal oxide or hydroxide (e.g., a metal oxide varies to a metal hydroxide) due to the influence of environmental conditions such as pH, temperature and oxidation-reduction potential of the liquid, and thus, while or after the metal oxide or hydroxide chemically changes, it decomposes the oxidizable or reducible substance.

Metal oxide or hydroxide in the composite may be composed of a single metal compound or a mixture of single metal compounds or a double compound of different metals. The metal oxide or hydroxide can be identified, for example, by the chemical analysis, X-ray diffractometry, X-ray photoelectron spectrometry, or electron probe microanalysis.

Fluorine-containing Organic Cation Exchanger

The fluorine-containing organic cation exchanger on which the metal oxide or hydroxide is supported includes commercially available fluorine-containing cation exchange resins and commercially available fluorine-containing cation exchange membranes. A preferable example of the cation exchanger is a tetrafluoroethylene-perfluorovinyl ether copolymer to which a cation exchangeable group has been introduced, which is commercially available as tradenames "Nafion" supplied by Du Pont and "Flemion" supplied by Asahi Glass. Perfluoro-hydrocarbon polymers are preferable in view of the enhanced durability, but a partially fluorinated hydrocarbon polymers, i.e., fluorinated hydrocarbon polymers having unsubstituted hydrogen atoms in the main chain, can be used which are usually prepared by contacting a hydrocarbon polymer cation exchanger with a gaseous mixture of fluorine and an inert gas such as nitrogen or argon.

The ion exchangeable group of the fluorine-containing cation exchanger includes, for example, a sulfonic acid group, a carboxylic acid group, a phosphonic acid group and a phenolic hydroxyl group. All of these groups can be advantageously used, but a sulfonic acid group and a carboxylic acid group are most preferable in view of the bonding force to the metal oxide or hydroxide.

The larger the ion exchange capacity of the fluorine-containing cation exchanger, the larger the bonding force between the cation exchanger and the metal oxide or hydroxide. Especially, in the case where the composite of the organic cation exchanger with the metal oxide or hydroxide is prepared by an ion exchange method as hereinafter described, when the cation exchanger has a large ion exchange capacity, a large amount of the metal oxide or hydroxide can be supported thereon and a solution containing an oxidizable substance or a reducible substance can be treated for a long period of time. The cation exchanger has preferably an ion exchange capacity of at least 0.3 milli-gram equivalent/gram of dry weight, more preferably at least 0.5 milli-gram equivalent/gram of dry weight.

The shape of the fluorine-containing cation exchanger is not particularly limited, and the cation exchanger can be in a membranous, spherical or fibrous form. A used cation exchange membrane which has been used as a separating membrane for electrolysis of sodium chloride by an ion exchange method can be used by cutting it into a desired shape and size.

Composite Containing Metal Oxide or Hydroxide

Preferably, at least 5% of the entire amount of the metal oxide or hydroxide supported on the fluorine-containing cation exchanger should be present within the composite. The part of the metal oxide or hydroxide which is supported on the surface of the cation exchanger is not readily separated, but the resistance to separation is inferior to that of the part of the metal oxide or hydroxide which is supported within the cation exchanger. The former part present on the surface of the composite exhibits an enhanced activity for the intended decomposition reaction as compared with the latter part present within the composite. Therefore, a certain part of the metal oxide or hydroxide should be present on the surface of the composite. The proportion of the metal oxide or hydroxide present on the surface of the composite to the entire amount of the metal oxide or hydroxide supported is usually up to 95%, preferably 2 to 90%, more preferably 5 to 80% and most preferably 10 to 70%.

The amount of the metal oxide or hydroxide supported on the fluorine-containing cation exchanger is preferably at least 0.1% by weight, more preferably 0.2% by weight, based on the weight of the composite. The larger the amount of the supported metal oxide or hydroxide, the larger the activity of the composite. However, with an increase of the amount of the supported metal oxide or hydroxide, the increase of the activity becomes lowered, and the bonding force between the cation exchanger and the metal oxide or hydroxide is reduced and, in the case where the composite is prepared by an ion exchange method as hereinafter described, the ion exchange procedure must be repeated many times. Therefore, the amount of the supported metal oxide or hydroxide is preferably up to 50% by weight based on the weight of the composite.

The amount of the supported metal oxide or hydroxide and the state of dispersion thereof can be determined by cutting the composite and observing the section by a scanning electron microscope, a transmission electron microscope, a light microscope or an electron probe microanalysis.

Use of the Metal Oxide- or Hydroxide-Containing Composite

The metal oxide- or hydroxide-containing composite can be used as a catalyst or an oxidizing agent for the removal of an oxidizable substance or a reducible substance which is present in a liquid of an industrial waste. Further, it would be used as catalysts for various organic syntheses involving oxidation and reduction reactions.

Preparation of the Metal Oxide- or Hydroxide-Containing Composite

The metal oxide- or hydroxide-containing composite can be prepared, for example, by the following processes.

(1) a process wherein a powdery metal oxide or hydroxide is mixed together with a binder and a thickening agent, a solvent is added to the mixture to form a paste, and the paste is transferred or printed onto a fluorine-containing organic cation exchanger. As the binder, there can be mentioned, for example, a fluorocarbon polymer such as polytetrafluoroethylene or polyhexafluoropropylene. As the thickening agent, there can be mentioned, for example, cellulose derivatives such as carboxymethylcellulose, methylcellulose and hydroxyethylcellulose, and water-soluble polymers such as polyethylene glycol, polyvinyl alcohol, polyvinyl pyrrolidone, sodium polyacrylate, poly(methyl vinyl ether), casein and polyacrylamide.

(2) a process wherein a fluoropolymer binder is mixed together with a powdery metal oxide or hydroxide, the mixture is shaped into a sheet and the sheet is pressed on a fluorine-containing organic cation exchanger.

(3) a process wherein the counter ion of a fluorine-containing organic cation exchanger is exchanged to a metal ion and placing the ion-exchanged organic cation exchanger in contact with an alkali and/or an oxidizing agent to convert the metal ion to a metal oxide or hydroxide.

Of the above-mentioned processes, process (3) is most preferable in view of the activity for reaction and the resistance to separation. In the process (3), a composite having a metal oxide or hydroxide supported within the body of the composite can be obtained by using a fluorine-containing organic cation exchanger having ion-exchangeable groups within the cation exchanger. By repeating the procedure of ion exchange and treatment with an alkali and/or an oxidizing agent, the amount of the supported metal oxide or hydroxide can be enchanced.

Preparation of Metal Oxide- of Hydroxide-Containing Composite by Ion Exchange Method The above-mentioned process (3), i.e., the process for the preparation of the metal oxide- or hydroxide-containing composite by an ion exchange method will now be described in detail.

The type of the fluorine-containing organic cation exchanger used for the ion exchange with the metal ion for the metal oxide or hydroxide is not particularly limited, and any of an H-type, an alkali metal type, an alkaline earth metal type and an ammonium type can be used. Of these, an H-type and an alkali metal type such as an Na type or a K type are preferable, and an H-type is most preferable in view of the conversion and rate of ion exchange. Most of the commercially available fluorine-containing organic cation exchangers are a K type and the used cation exchange membranes used for electrolysis of sodium chloride by an ion exchange method are an Na type. Therefore, these cation exchangers can be used either as they are or after they are ion-exchanged to an H-type, for the ion exchange with the metal for the metal oxide or hydroxide.

The ion exchange with the metal for the metal oxide or hydroxide can be carried out by placing a fluorine-containing organic cation exchanger with a solution or suspension in which a compound containing the metal is dissolved or suspended. As solvents used for the preparation of the solution or suspension, water and/or organic solvents which are usually used for the ion exchange of this type can be used. Of these, water is economically advantageous. The metal-containing compound is not particularly limited provided that the intended metal ion is produced, and is usually selected from chlorides, nitrates, sulfates, acetates, carbonates, phosphates and hydroxides. Among these salts, chlorides, nitrates and sulfates are preferable because these are readily available and cause no pollution nuisance. The concentration of the metal-containing compound is usually in the range of 0.01 mole/l to the saturation point, preferably from 0.1 to 3 moles/l.

Where an H-type organic cation exchanger is used, the ion exchange can be effected at an enhanced rate even in a suspension of a water-insoluble or slightly soluble compound containing the metal such as a metal oxide. In this ion exchange, the anion does not accumulate in the reaction mixture and the metal ion also does not accumulate because the organic cation exchanger is an H-type. Therefore, the suspension can be repeatedly used. If a metal hydroxide is used, the rate of ion exchange can be enhanced, and, the smaller the particle size of the powdery metal hydroxide, the more enhanced the rate of ion exchange. Preferably, the particle diameter of the metal hydroxide is not larger than 100 μm.

The ion exchange is usually carried out at a temperature of 5° to 100° C., preferably 10° to 90° C., for a period of 2 to 24 hours. When the reaction temperature is too low, the rate of ion exchange is undesirably low. When the reaction temperature is too high, the reaction apparatus must be constructed from an expensive material. The reaction temperature may be an ordinary temperature.

The ion exchange can be carried out in any of the fixed bed, fluidized bed, moving bed and suspension bed. The degree of ion exchange reaches 30% or higher and, when a fixed bed through which a reactant liquid passes is used or a suspension bed is repeatedly used, the degree of ion exchange readily reaches approximately 100%. In the case where the above-mentioned H-type fluorine-containing organic cation exchanger is ion exchanged with a suspension of the metal hydroxide, the degree of ion exchange of an approximately 100% can be easily reached with a small amount of the suspension and by any reaction bed.

When the amount of the metal oxide or hydroxide supported in the composite as obtained by introducing the metal into a fluorine-containing organic cation exchanger and then converting the metal ion to an oxide or hydroxide form is not reached to the desrired value, the procedure of introduction of the metal and conversion of the metal to an oxide or hydroxide form must be repeated. To obtain a composite containing the desired amount of the supported metal oxide or hydroxide with a minimum number of repetition of the procedure, the conditions under which the metal is introduced into the cation exchanger and the metal is convereted to an oxide or hydroxide form should be selected so that the degree of ion exchange of at least 50% is obtained.

The organic cation exchanger to which the metal ion has been introduced by an ion exchange is placed in contact with in alkali and/or an oxidizing agent, the metal ion is converted to an oxide or hydroxide form to obtain a composite containing the metal oxide or hydroxide.

As specific examples of the alkali used for the conversion of the metal ion to an oxide or hydroxide form, there can be mentioned hydroxides and carbonates of alkali metals, hydroxides of alkaline earth metals, ammonia and amines. These alkalis are used in an aqueous solution form. Of these, strong alkalis such as alkali metal hydroxides, for example, sodium hydroxide and potassium hydroxide are preferable because the conversion of the metal ion to an oxide or hydroxide form can be effected at an enhanced rate. By the contact with an alkali, the metal ion is deposited in the form of a fine hydroxide precipitate within and on the surface of the organic cation exchanger, which precipitate is strongly bonded to the cation exchanger.

As the oxidizing agent used for the conversion of the metal ion to an oxide or hydroxide form, there can be mentioned, for example,, chlorine, hypochlorous acid and hypochlorites, chlorous acid and chlorites, chloric acid and chlorates, chlorcyanuric acid and salts thereof, bromine, hypobromous acid and hypobromites, bromous acid and bromites, bromic acid and bromates, iodine, oxyacids of iodine and salts thereof, hydrogen peroxide, ozone, permanganic acid and permanganates, and bichromic acid and bichromates. Of these, chlorine and hypochlorites are preferable because theses are readily available and give no pollution nuisance. By the contact with the oxidizing agent, the metal ion is deposited in the form of a finely divided oxide or hydroxide of metal having a higher valency within and on the surface of the organic cation exchanger, which is strongly bonded to the cation exchanger.

The bonding force between the metal oxide or hydroxide and the cation exchanger in the composite obtained by using an oxidizing agent is stronger than that in the composite obtained by using an alkali, and the activity of the metal oxide or hydroxide in the former composite is higher than that of the metal oxide or hydroxide in the latter composite. It is presumed that the higher the valency of the metal of the oxide or hydroxide in the composite, the larger the electrical interaction to the ion-exchange group of the cation exchanger and the larger the effective surface area.

The treatment with the oxidizing agent is carried out preferably at a pH of at least 5, more preferably at least 7, for completing the conversion at a high efficiency within a short period of time. The permissible highest pH value is not particularly limited, but is usually below 14 because the efficiency of conversion increases only to a slight extent at a pH exceeding 14. An aqueous hypochlorite solution is alkaline and hence can be used as it is. Chlorine produces an acid and hence is used together with an alkali so that the pH value is at least 5.

The treating time for the conversion of the metal ion to an oxide or hydroxide form is usually 3 minutes to 3 hours, although the appropriate time varies depending upon the particular alkali and/or oxidizing agent, concentration and amount, pH and temperature. The treatment temperature for the conversion is usually 5° to 90° C., preferably 10° to 70° C. An ordinary temperature is advantageous. Too low temperature requires a long treating time for conversion or results in a low degree of conversion, and too high temperature invites an undesirably large consumption of heat energy.

To increase the amount of the metal oxide or hydroxide contained in the composite, the procedure of the above-mentioned exchange and conversion should be repeated preferably 2 or 3 times. The repetition of 4 times or more increases only slightly the amount of the supported metal oxide or hydroxide.

Removal of Oxidizable Substance or Reducible Substance

In accordance with the present invention, an oxidizable substance in a solution, for example, of an industrial waste is removed by a process wherein the oxidizable substance-containing solution is placed in contact with the above-mentioned composite in the presence of an oxidizing agent (this process is hereinafter called as "first process"), or a process wherein the above-mentioned composite is placed in contact with an oxidizing agent and then the composite is placed in contact with the oxidizable substance-containing solution (this process is hereinafter called as "second process").

In accordance with the present invention, a reducible substance in a solution is removed by a process wherein the reducible substance-containing solution is placed in contact with the above-mentioned composite (this process is hereinafter called as "third process").

As the oxidizable substances to be removed by the first and second processes, there can be mentioned chemically oxygen demanding substances (i.e., COD ingredients), for example, alcohols, aldehydes, ketones, organic acids, carbohydrates, ammonia, ammonium salts, amines and amino acids. These oxidizable substances are decomposed to be thereby converted to harmless substances such as water, carbon dioxide gas and nitrogen. Household waste water contains salient amounts of oxidizable substances, and industrial waste water in a chemical industry, a pulp and paper industry, a textile industry and a food processing industry often contains oxidizable substances. The first and second processes can be advantageously applied to the treatment of household waste water and industrial waste water.

In the first process, the oxidizable substance is decomposed by placing the oxidizable substance-containing solution in contact with the metal oxide- or hydroxide-containing composite in the presence of an oxidizing agent. As the oxidizing agent, there can be mentioned, for example, hypochlorous acid, sodium hypochlorite, calcium hypochlorite, hydrogen peroxide and ozone. The oxidizing agent is used usually in an amount of the range from equimolar to the oxidizable substance to approximately twice of the equimolar amount.

In the first process, the metal oxide- or hydroxide-containing composite is used as a catalyst. In contrast, in the second process, the metal contained in the composite is converted to a highly oxidized state by contacting the composite with an oxidizing agent, and the oxidizing action of the highly oxidized metal is utilized. With an advance of oxidation of the oxidizable substance, the metal is reduced to a lowly oxidized state and finally the oxidizing action is lost. However, the thus-reduced metal oxide- or hydroxide-containing composite can be repeatedly used by treating the composite with an oxidizing agent. The oxidizing used can be selected from those exemplified above.

As the reducible substances to be removed by the third process, there can be mentioned, for example, chlorine, hypochlorous acid and hypochlorites, chlorous acid and chlorites, chloric acid and chlorates, chloroisocyanuric acid and salts thereof, bromine, hypobromous acid and hypobromites, bromous acid and bromites, bromic acid and bromates, iodine, oxyacids of iodine and salts thereof, hydrogen peroxide and ozone. When decomposed by the contact with the metal oxide- or hydroxide-containing composite, these reducible substances are converted to harmless substances such as chlorides, bromides, iodides, water and oxygen. As specific examples of the waste water containing a reducible substance, there can be mentioned chlorine-containing waste water in a salt electrolysis industry, waste water from plants for making or utilizing sodium hypochlorite, high chloride of lime, chloroisocyanuric acid, sodium bromite, hydrogen bromide, bromine and hydrogen peroxide, and waste water from a step of oxidation with ozone, a sterilization step and a bleaching step. Further, the third process can be adopted not only for treating waste water but also for treating process liquids in various industries, for example, a process liquid in the step of dechlorination in a salt electrolysis by an ion exchange membrane.

When a reducible substance-containing solution is placed in contact with the metal oxide- or hydroxide-containing composite, the reducible substance is readily decomposed and the metal of the oxide or hydroxide is transferred to a highly oxidized state. The metal of a highly oxidized state is not transferred to a higher oxidation state, but the metal of the highly oxidized state acts as a catalyst for continuing the decomposition of the reducible substance.

The processes of the invention can also be adopted for removing an oxidizable substance and a reducible substance from a solution containing both the oxidizable substance and the reducible substance. Namely, the solution is placed in contact with the metal oxide- or hydroxide-containing composite whereby the reducible substance is decomposed, and simultaneously, by adding an oxidizing agent into the reaction mixture or previously treating the metal oxide- or hydroxide-containing composite with an oxidizing agent, the oxidizable substance can be decomposed.

Even though the reducible substance and the oxidizable substance do not react with each other, the decomposition of the reducible substance due to the catalytic action of the metal oxide- or hydroxide-containing composite produces nascent oxygen, which directly decomposes the oxidizable substance and enhances the oxidation state of the metal contained in the composite. The metal having the thus-enhanced oxidation state also act for decomposing the oxidizable substance. Therefore, the decomposition of the oxidizable substance and the reducible substance in the solution can be achieved with a small amount of an oxidizing agent or occasionally without the use of an oxidizing agent. In certain conditions, for example, in the case where the treating temperature is higher than the temperature before the treatment, part of the oxidizable substance and part of the reducible substance directly react with each other. In this case, the load of the composite can be mitigated and the amount of an oxidizing agent can be reduced.

In conventional processes wherein an ion exchanger having supported thereon a metal oxide or hydroxide or a catalyst is used for treating a solution or suspension containing a suspended substance such as resins and inorganic substances such as silica, alumina, calcium carbonate, magnesium hydroxide and an iron oxide, and ions capable of readily producing a water-insoluble or slightly soluble precipitate, such as an alkaline earth metal ion, e.g., ions of Mg, Ca, Sr and Ba, the suspended substance or the precipitate is deposited on the ion exchanger and thus the catalytic activity of the ion exchanger is drastically reduced.

In sharp contrast, in the processes of the invention, the metal oxide- or hydroxide-containing composite is not readily affected by the suspended substances and, even when a solution containing an alkaline earth metal ion is treated, a precipitate is not readily produced, although the reasons therefor are not definite. Therefore, the processes of the invention can be employed for treating, for example, a waste liquid containing a solid substance such as calcium carbonate, silica or an iron oxide; a waste liquid of a high degree of chloride of lime which contains a calcium ion at a high concentration; a waste calcium chloride liquid containing an organic substance such as propylene glycol discharged from a plant of producing propylene oxide by chlorohydrination of propylene or saponification with milk of lime; and an aqueous waste salt liquid containing organic substances discharged from a plant of producing epichlorohydrin from allyl chloride as a starting material by using milk of lime as a saponifying agent.

Any of the fixed bed, fluidized bed, moving bed and suspended bed can be employed in the processes of the invention. The processes of the invention can be carried out in any of the continuous, batchwise and semi-batchwise manners. A fixed bed reaction in a continuous manner is industrially preferable. When a solid substance is present, a suspended bed reaction in a continuous manner is preferable. In the fixed bed reaction in a continuous manner, preferably a large amount of liquid is circulated while the pH is adjusted with an alkali or acid.

The shape of the metal oxide- or hydroxide-containing composite is not particularly limited, and any of the membrane, sphere and fiber can be employed. The membranous composite can be used in the form of a roll, a honeycomb, or cut small square pieces. The spherical composite preferably has a particle diameter similar to that of ordinary ion exchange resins, i.e., a particle diameter of 0.1 to 1 mm. When the composite is used in a suspended bed or a fluidized bed, the composite has preferably a small size because the separation of the metal oxide or hydroxide due to collision can be minimized.

The concentration of the composite in the liquid varies depending upon the particular type of bed used. In a suspended bed or fluidized bed, a concentration of 30 to 200 g/l is preferable because the liquid becomes uniform and the composite is not distorted during the treatment. In a fixed bed, a higher concentration, i.e., a concentration of 100 to 1,000 g/l is usually employed.

The pH of the liquid varies depending upon the particular metal of the supported oxide or hydroxide. Usually, a high activity for reaction can be obtained at a pH of 3 to 11, more preferably of 5 to 10. Where the liquid contains an alkaline earth metal and carbon dioxide is produced, a precipitate is readily produced at a high pH value, and therefore, the pH value should preferably be below 10, preferably below 9.

The treating temperature is not particularly limited, and the higher the temperature, the more enhanced the treating efficiency. In view of the balance between the energy consumption and the rate of reaction, the treating temperature is preferably 10° to 100° C., more preferably 5 to 10. The treating time (average residence time) also is not particularly limited, and is usually 0.2 to 10 hours.

The invention will now be specifically described by the following examples which illustrate only embodiments of the invention and by no means limit the scope of the invention.

In the examples, the degree of support of the metal in a metal oxide or hydroxide supported on a fluorine-containing organic cation exchanger was determined as follows. The composite of the metal oxide or hydroxide with the organic cation exchanger was immersed in hydrochloric acid to dissolve the metal oxide or hydroxide, and the amount ("A" g) of the dissolved metal was measured by an inductively coupled plasma emmission spectroscopic analysis using SPS-7000 supplied by Seiko Instruments Inc. The fluorine-containing organic cation exchanger, which was rendered the H-type by the dissolution of the metal oxide or hydroxide, was dried at 110° C. for 12 hours, and the weight ("W" g) of the dried H-type cation exchanger was measured. The degree of support of the metal is expressed by the following formula.

Degree of support of metal (% by weight)=$(A/W)\times 100$

The proporation of the metal oxide or hydroxide supported within the organic cation exchanger to the total of the metal oxide or hydroxide supported within the cation exchanger and that supported on the surface of the cation exchanger was determined by cutting the metal oxide- or hydroxide-containing composite, and the section thereof was observed by a scanning electron microscope, an electron probe microanalysis and an X-ray photoelectric spectrophotometry.

EXAMPLE 1

A fluorine-containing organic cation exchanger (Nafion 954 supplied by Du Pont), which was used for a salt electrolysis using an ion exchange membrane, was thoroughly washed with water and then cut into pieces having a size of 10 mm × 10 mm (the pieces are hereinafter referred to as "used Nafion membrane pieces").

A two liter-volume beaker was charged with 1.5 liters of an aqueous N—$NiCl_2$ solution and 300 g of the used Nafion membrane pieces in a wet state, and the content was stirred for one hour to effect an ion exchange. The solution was removed from the beaker and 1.5 liters of a fresh aqueous N—$NiCl_2$ solution was placed in the beaker. The content was stirred for one hour and then the solution was removed from the beaker.

A two liter-volume beaker was charged with 1.5 liters of an aqueous 3.0 wt. % NaClO solution having a pH of 10, and the entire amount of the ion-exchanged, used Nafion membrane pieces was placed in the beaker whereby the Ni ion of the cation exchanger was converted to a black oxide.

The degree of support of Ni was 2.0% by weight in the thus-prepared composite, and the proportion of $Ni_2O_3$ supported within the ion exchange membrane to the total of $Ni_2O_3$ supported within and on the surface of the ion exchange membrane was 63%.

A 1.5 liter volume separable flask reactor provided with a overflow pipe was charged with 120 g (dry weight basis) of the above-mentioned composite. An aqueous solution containing 10.2% by weight of Ca($ClO)_2$, 19.8% by weight of NaCl and a minor amount of solids constituent was continuously supplied into the reactor at a rate of 0.35 l/hr while the content was stirred at a rate of 300 rpm and was allowed to overflow the reactor. Thus, Ca($ClO)_2$ was decomposed and evolution of oxygen gas was observed. When 3 days elapsed from the commencement of reaction, the concentration of Ca($ClO)_2$ at an outlet of the reactor reached 1.91% by weight and thus the degree of decomposition was 81.3%. When the reaction was continued for 28 days after the commencement of reaction, the concentration of Ca($ClO)_2$ at the outlet of the reactor reached 1.96% and the degree of decomposition was 80.8%. Thus, the activity of the composite varied only to a slight extent with the lapse of time, and separation of the supported $Ni_2O_3$ was observed only to a negligible extent.

COMPARATIVE EXAMPLE 1

The test of catalyst activity and durability described in Example 1 was repeated wherein 300 g of a black columnar rod-shaped catalyst composed of Nickel peroxide supported on cement ("Panion SA" supplied by Yuko Metal K. K.) was used instead of the $Ni_2O_3$-supported ion exchange membrane with all other conditions remaining substantially the same. The degree of support of Ni in the cement was about 30%. The catalyst tended to be sedimented in the bottom of the reactor, and therefore, only in the upper part of the reactor, the content was stirred so that the stirring vanes came into collision with the catalyst. In the initial stage of reaction, evolution of oxygen gas was observed. When one day elapsed from the commencement of reaction, the concentration of Ca($ClO)_2$ at the outlet of the reactor was 2.76% by weight, and the degree of decomposition was 72.9% by weight. When 3 days elapsed from the commencement of reaction, the concentration of Ca($ClO)_2$ at the outlet of the reactor was 8.76% and the degree of decomposition was drastically reduced to 14.1%. At that time, evolution of oxygen gas from the reactor was observed only to a negligible extent, and a white precipitate was found on the catalyst, which was proved to be calcium carbonate by X-ray diffractomery

EXAMPLE 2

The same composite containing $Ni_2O_3$ as that used in Example 1 was prepared and its activity and durability were tested as follows.

Using the same 1.5 liter-volume separable flask reactor as that used in Example 1, a solution containing a calcium ion at a high concentration, more specifically, 28% by weight of $CaCl_2$ and 1.25% by weight of Ca($ClO)_2$ was treated with 120 g (dry weight basis) of the $Ni_2O_3$-containing composite. When 3 days elapsed after the commencement of reaction, the concentration of Ca($ClO)_2$ at the outlet of the reactor was 0.23% by weight and the degree of decomposition was 81.6%. When 35 days elapsed after the commencement of reaction, the concentration of Ca($ClO)_2$ at the outlet of the reactor was 0.22%. Thus, the activity of the $Ni_2O_3$-containing composite varied only to a negligible extent. Appearance of the composite did not vary, and the content in the reactor was almost transparent and a suspended black Ni substance was not found.

EXAMPLE 3

The same composite containing $Ni_2O_3$ as that used in Example 1 was prepared and its durability were tested as follows.

A column having an inner diameter of 42 mm and a height (packed layers height) of 1,000 mm, provided with a jacket, was charged with 300 g of the $Ni_2O_3$-containing composite, and the temperature inside the column was maintained at 50° C. by circulating warm water in the jacket. An aqueous NaClO solution having an available chlorine content of 5.3% by weight and a pH of 11 was continuously supplied into an inlet in the bottom part of the column at a rate of 1.0 l/hr, while the treated liquid was allowed to overflow from the top of the column. When 2 days elapsed from the commencement of reaction, the available chlorine content at the column outlet was 0.090% by weight and the degree of decomposition was 98.3%. When 38 days elapsed after the commencement of reaction, the available chlorine content at the column outlet was 0.096% by weight and the degree of decomposition was 98.2%. Thus, no reduction of activity was observed. The content of the column was colorless transparent, and both dissolution of Ni and separation of $Ni_2O_3$ were not observed.

EXAMPLE 4

The same composite containing $Ni_2O_3$ as that used in Example 1 was prepared and its activity and durability were tested as follows.

A 1.5 liter-volume separable flask reactor was charged with 0.5 liter of an aqueous 1.15 wt. % methanol solution and 70 g of the $Ni_2O_3$-containing composite, and then, 0.5 liter of an aqueous sodium hypochlorite solution having an available chlorine content of 6.5% by weight was added, and the content was maintained at 50° C. When 0.3 hour elapsed after the commencement of reaction, the concentration of methanol in the content was 0.24% by weight and the degree of decomposition was 58.3%. The content was almost colorless transparent and separation of $Ni_2O_3$ from the composite was observed only to a negligible extent.

EXAMPLE 5

A composite composed of cobalt oxide supported on Nafion membrane pieces was prepared by the same procedure as that described in Example 1 except that an aqueous N—$CoCl_2$ solution was used instead of an aqueous N—$NiCl_2$ solution. The composite was black. The degree of support of Co was 1.8% by weight, and the proportion of Co oxide supported within the ion exchange membrane to the total of Co oxide supported within and on the surface of ion exchange membrane was 75%.

A 200 ml-volume round flask reactor was charged with 100 ml of an aqueous 6.0 wt. % NaClO solution having a pH of 12.0. The content was maintained at 50° C. with stirring at a rate of 300 rpm, and 4.0 g (dry weight basis) of the Co oxide-containing composite was added in the reactor. When 2 hours elapsed after the commencement of reaction, the concentration of NaClO was 1.6% by weight and thus the degree of decomposition was 73.3%. Separation of Co oxide from the composite was not observed.

EXAMPLE 6

A composite composed of copper oxide supported on Nafion membrane pieces was prepared by the same procedure as that described in Example 1 except that an aqueous N—$CuCl_2$ solution was used instead of an aqueous N—$NiCl_2$ solution. The composite was black. The degree of support of Cu was 1.2% by weight.

A 200 ml-volume round flask reactor was charged with 100 ml of an aqueous 6.0 wt. % NaClO solution havinf a pH of 12.0. The content was maintained at 70° C. with stirring at a rate of 300 rpm, and 5.0 g (dry weight basis) of the Cu oxide-containing composite was added in the reactor. When 2 hours elapsed after the commencement of reaction, the concentration of NaClO was 2.2% by weight and thus the degree of decomposition was 63.9%. Separation of Cu oxide from the composite was not observed.

EXAMPLE 7

A 200 ml-volume beaker was charged with 100 ml of an aqueous Pd solution for chemical analysis (an aqueous N—$HNO_3$ solution containing 1,000 ppm of a Pd ion, supplied by Kanto Chemical K. K.) and then 5 g of the used Nafion membrane pieces (wet state) was added. After one hour, the Nafion membrane pieces were taken from the beaker, washed with distilled water, and placed into a 200 ml-volume beaker which was previously charged with 100 ml of an aqueous 3.0 wt. % NaClO solution whereby a composite composed of a Pd oxide supported on the used Nafion membrane pieces was obtained. The composite was brown. The degree of support of Pd was 0.03% by weight.

A 200 ml-volume round flask reactor was charged with 100 ml of an aqueous 5.0 wt. % $H_2O_2$ solution having a pH of 9.0. The content was maintained at 70° C. with stirring at a rate of 300 rpm, and 2.0 g (dry weight basis) of the Pd oxide-containing composite was added in the reactor. When one hour elapsed after the commencement of reaction, the concentration of $H_2O_2$ was 1.4% by weight and thus the degree of decomposition was 72.0%. Separation of Pd oxide from the composite was not observed.

EXAMPLE 8

A composite composed of manganese oxide supported on Nafion membrane pieces was prepared by the same procedure as that described in Example 1 except that an aqueous N—$MnCl_2$ solution was used instead of an aqueous N—$NiCl_2$ solution. The composite was black. The degree of support of Mn was 0.9% by weight.

A 200 ml-volume round flask reactor was charged with 100 ml of an aqueous 5.0 wt. % $H_2O_2$ solution having a pH of 9.0. The content was maintained at 50° C. with stirring at a rate of 300 rpm, and 2.0 g (dry weight basis) of the Mn oxide-containing composite was added in the reactor. When 2 hours elapsed after the commencement of reaction, the concentration of $H_2O_2$ was 0.16% by weight and thus the degree of decomposition was 96.8%. Separation of Mn oxide from the composite was not observed.

EXAMPLE 9

A composite composed of iron oxide supported on Nafion membrane pieces was prepared by the same procedure as that described in Example 7 except that an aqueous Fe solution for chemical analysis (an aqueous 0.1N—$HNO_3$ solution containing 1,000 ppm of a Fe ion, supplied by Kanto Chemical K. K.) was used instead of the aqueous Pd solution. The composite was brown. The degree of support of Fe was 0.8% by weight.

A 200 ml-volume round flask reactor was charged with 100 ml of an aqueous 6.54 wt. % $H_2O_2$ solution having a pH of 9.0. The content was maintained at 50° C. with stirring at a rate of 300 rpm, and 1.6 g (dry weight basis) of the Fe oxide-containing composite was added in the reactor. When one hour elapsed after the commencement of reaction, the concentration of $H_2O_2$ was 1.82% by weight and thus the degree of decomposition was 72.2%. Separation of Fe oxide from the composite was not observed.

We claim:

1. A composite comprising a fluorine-containing organic cation exchanger and at least one metal oxide or hydroxide, said metal selected from the group consisting of manganese and elements of group 1B and group 8 of the periodic table, and at least 5% by weight of the entire amount of the metal oxide or hydroxide being supported within the fluorine-containing organic cation exchanger, said composite prepared by exchanging counter ions of the organic cation exchanger with a metal ion forming the metal oxide or hydroxide and thereafter contacting the ion-exchanged organic cation exchanger with an alkali or an oxidizing agent or both thereby converting the metal ion to an oxide or hydroxide form.

2. A composite as claimed in claim 1, wherein said metal of the metal oxide or hydroxide is selected from the group consisting of nickel, cobalt, copper and palladium.

3. A composite as claimed in claim 1, wherein said fluorine-containing organic cation exchanger comprises a cation exchange resin composed of a fluorocarbon polymer having an ion exchange group selected from the group consisting of a sulfonic acid group, a carboxylic acid group, a phosphonic acid group and a phenolic hydroxyl group, and having an ion exchange capacity of at least 0.3 milli-gram equivalent/gram of the cation exchange resin.

4. A composite as claimed in claim 1, wherein said composite comprises 0.1 to 50% by weight, based on the weight of the composite, of the metal oxide or hydroxide.

5. A process for preparing a composite comprising a fluorine-containing organic cation exchanger and at least one metal oxide or hydroxide, said metal selected from the group consisting of manganese and elements of group 1B and group 8 of the periodic table, said process comprising the steps of:

exchanging counter ions of the organic cation exchanger with a metal ion for forming the metal oxide or hydroxide, and thereafter contacting the ion exchanged organic cation exchanger with at least one material selected from the group consisting of an alkali and an oxidizing agent, whereby the metal ion is converted to an oxide or hydroxide form.

6. A process for preparing a composite as claimed in claim 5, wherein the oxidizing agent is an aqueous solution of hypochlorous acid or a hypochlorite.

* * * * *